United States Patent

[11] 3,633,069

[72] Inventors: Georges Bernard, Saint Egreve; Adrien Scole, Grenoble, both of France
[21] Appl. No.: 101,272
[22] Filed: Dec. 24, 1970
[45] Patented: Jan. 4, 1972
[73] Assignee: Merlin Gerin, Societe Anonyme, Grenoble, France
[32] Priorities: Jan. 14, 1970
[33] France
[31] 01314;
June 2, 1970, France, No. 20274

[54] ALTERNATING CURRENT CIRCUIT-INTERRUPTING SYSTEM COMPRISING A RECTIFIER SHUNT PATH
21 Claims, 6 Drawing Figs.
[52] U.S. Cl. ............................................. 317/11 E, 317/11 B, 307/136
[51] Int. Cl. ............................................. H01h 9/30
[50] Field of Search .............................. 317/11 A, 11 E; 307/112, 136, 137, 138, 139, 140, 85, 86, 87, 149, 150, 92, 93, 94

[56] References Cited
UNITED STATES PATENTS
3,395,316  7/1968  Denes et al. ............ 317/11 E
3,543,047  11/1970  Renfrew ................. 317/11 E Primary Examiner—Herman J. Hohauser
Attorney—Stevens, Davis, Miller & Mosher

ABSTRACT: A medium- or high-voltage switching system for AC current comprising two series-connected switches substantially simultaneously opened by random operated opening means. The first switch is shunted by a series arrangement of rectifiers and of a thyristor having together a reverse voltage rated to withstand the restriking voltage across said first switch. Electronic trigger means fed by the arcing voltage across the first switch and responsive to the current to be interrupted trigger said thyristor shortly before current zero in the appropriate half-cycle to commutate said current from the switch to the shunt path. The arcing interval of the first switch subsequentially deionizes and the opened second switch prevents application of the recovery voltage to the rectifiers.

ALTERNATING CURRENT CIRCUIT-INTERRUPTING SYSTEM COMPRISING A RECTIFIER SHUNT PATH

This invention relates to an alternating current current-interrupting system comprising a rectifier shunt path.

In the prior art arrangements it is known, when a mechanical switch opens, to divert the current to a shunt path comprising rectifier means so as to extinguish the arc drawn between the switch contacts during the half cycle at which the rectifier means are conductive. During the next half-cycle, in which the rectifier means are nonconductive, the current is interrupted if the restriking voltage is too low to restrike the arc across the open switch contacts. Prior art employs also a second mechanical switch connected in series to prevent the appearance of the recovery voltage across the first switch and the rectifier means after opening of the second switch.

These known devices permit random switching regardless of the phase of the current, but the rectifier means must be rated for the full load current of the AC network in which the device is incorporated.

To extend the field of application of switching devices having a shunt path including rectifier means of a given rating, the prior art has employed a system comprising a shunt path composed of a plurality of series-connected rectifiers capable of withstanding the recovery voltage of the AC network, a controlled semiconductor rectifier (or thyristor) being also connected in series with said rectifiers whereby the thyristor is triggered on to render the shunt path effective only shortly, generally less than 0.5 millisecond, before the passage of the current through zero, at a time when the value of the current is decreasing and relatively low. It is then necessary for the shunt path to have a second mechanical switch of smaller current rating connected in series and operated subsequently to the main switch during the nonconductive half-cycle of the shunt path so that the thyristor does not at the next half-cycle have to withstand the full forward recovery voltage for which the thyristor is not laid out. Unfortunately, in this case the advantage of higher breaking power must be paid by providing expensive synchronization devices in these systems to sequentially operate the opening of said main and second switch in due time.

It is an object of this invention to obviate these disadvantages and to provide a simplified AC interrupting system which retains the advantages of optimum loading of the rectifiers and the possibility of using switches substantially devoid of current interrupting capacity.

It is another object of the invention to provide a system of the kind mentioned which does not need synchronization devices for operating the mechanical switches which can be random operated.

It is another object of the invention to provide a triggering device for the thyristor gating the latter earlier in the case of low currents than in the case of heavy currents, the thyristor load being smaller in the case of low currents than in the case of heavy currents despite the longer ON-time.

It is still another object of the invention to provide simple electronic means for controlling the gating of the thyristor.

Another important object of the invention is to provide trigger circuit controlling the rating of the thyristor and which is energized by the voltage across the mechanical switch shunted by the rectifier means upon the opening thereof.

Still another object of the invention is to provide a trigger circuit for the thyristor which is not energized when the interrupting system is not operated.

It is a further object of the invention to provide a trigger circuit retaining in a very simple manner only the appropriate control signals for switching ON the thyristor, only when the polarity of the current permits effective interruption.

These and other objects and advantages of the invention will become apparent from the following description of some embodiments which are shown in the accompanying drawings, wherein.

Figure 2:
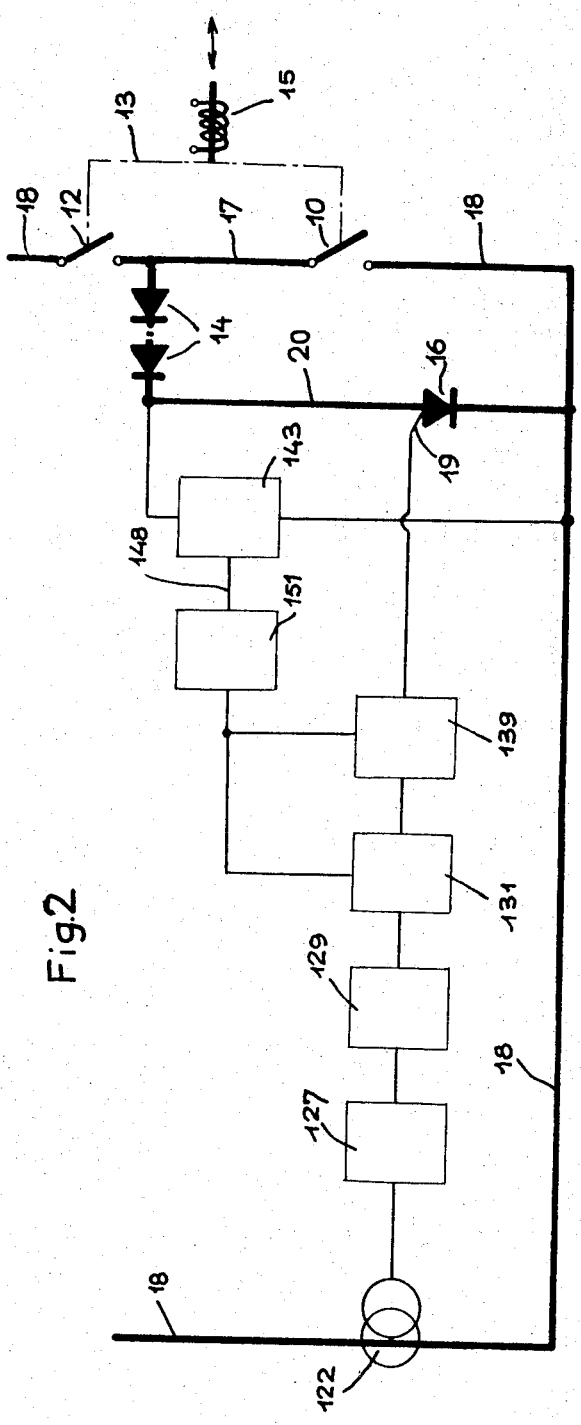
FIG. 2 shows the block diagram of a first embodiment of the invention.
Figure 3:
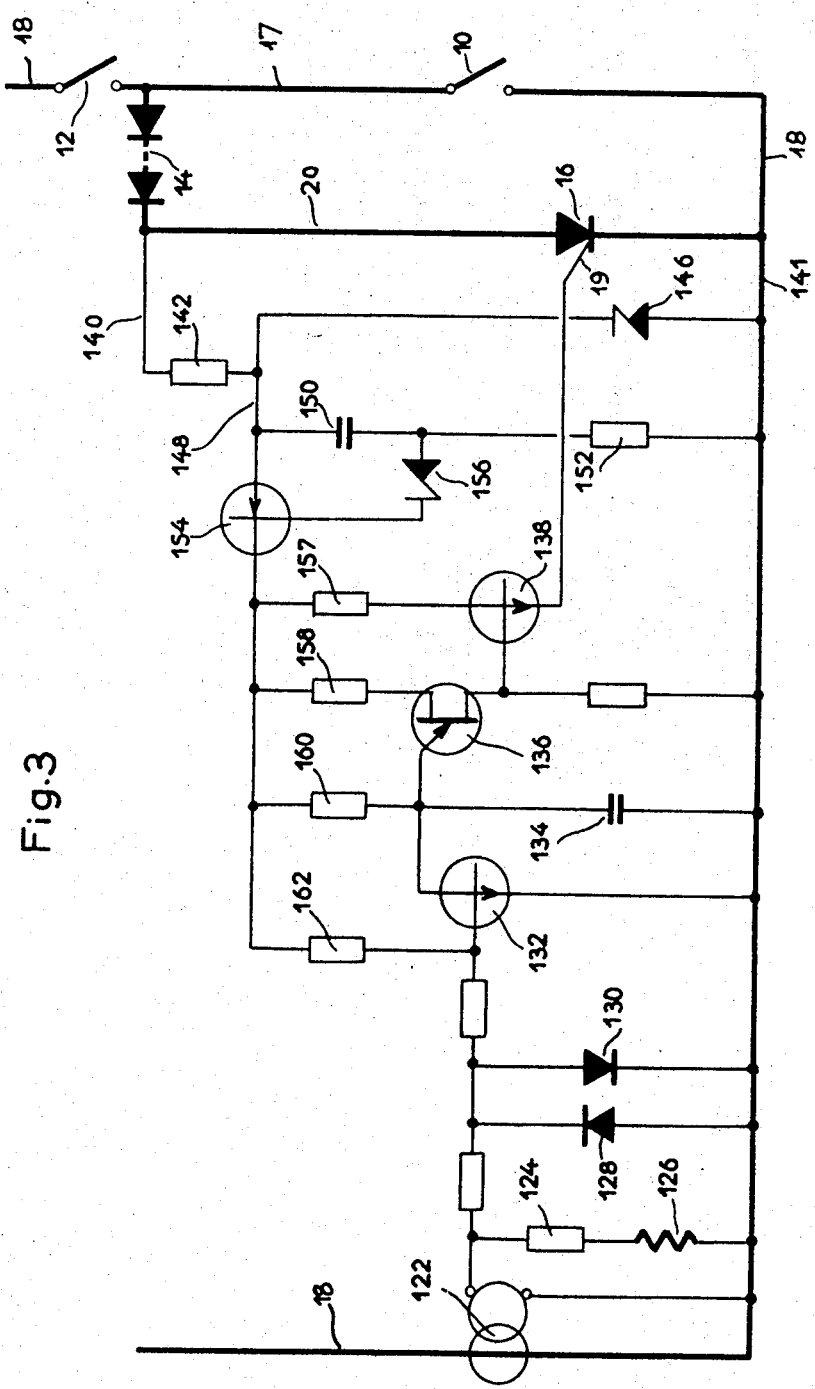
FIG. 3 is a circuit schematic representation of the embodiment according to FIG. 2.
Figure 4:
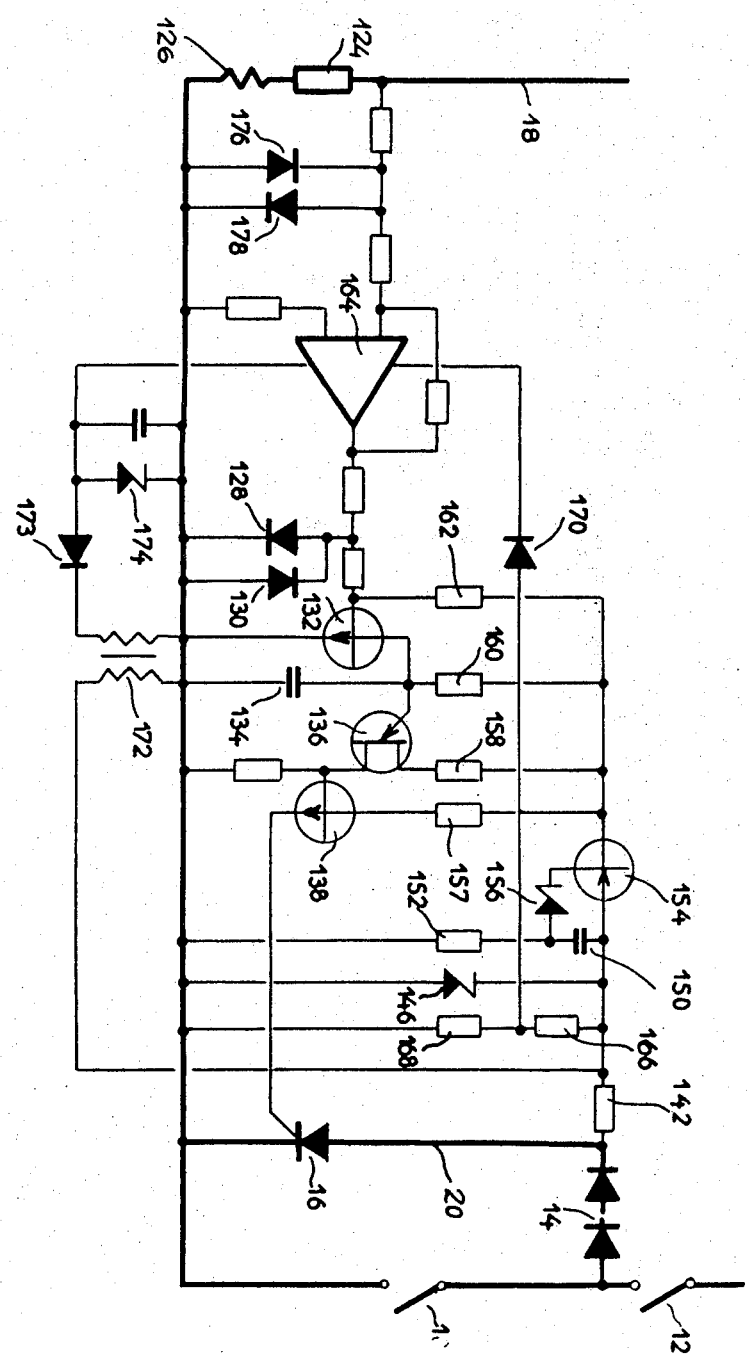
FIG. 4 shows the circuit diagram of a second embodiment.

An electric medium or high-voltage line 18 shown in heavy lines in FIGS. 2, 3 and 4 has two mechanical switches 10, 12, which may be circuit interrupters connected in series and operated substantially simultaneously, e.g. by way of a mechanical connection 13 operated by a fault relay 15. Switch 10, incorporated in the main current path 17, 18, is shunted by a shunt path 20 comprising a series arrangement of a plurality of semiconductor rectifier elements, such as diodes 14, and a thyristor 16, such as a silicon-controlled rectifier (SCR) having a control gate 19. The number of rectifiers 14, 16 connected in series depends upon the rated line voltage in such a manner that the peak reverse voltage thereof is rated to withstand the restriking voltage of the line 18 after drawing of an arc and subsequent extinction of the arc across the contact means of switch 10. (In the present disclosure the term "restriking voltage" is used to denote the voltage appearing across the terminals — i.e. of the shunt path — immediately after current zero, in other words the transient or steady state recovery voltage, whatever the greatest.) An electronic trigger system to be described in detail hereinafter is connected to gate 19 so as to switch ON (render conductive) the thyristor 16 at a predetermined point of time after the opening of the mechanical contacts 10 and 12 by relay 15, for instance in case of a major fault in the AC network.

The operation of the main circuit is as follows:

The switches 10, 12 open at random, substantially simultaneously, regardless of the phase of the current flowing through the contacts thereof, that is without the help of a synchronization device. The usual arcing occurs between the stationary and movable contacts of the switches 10, 12, the AC current continuing to flow through the line 18. The shunt 20 remains nonconductive, the thyristor 16 being rated to withstand the arcing voltage of switch 10 applied to it in one direction or the other depending upon the polarity of the current half-cycle during which the switches 10 and 12 have been spaced. The trigger device fires the thyristor 16 shortly before current zero during the half-cycle of the current in which the rectifiers 14 are conductive for said current (for reasons of commodity this half-cycle will be arbitrary called "positive" hereafter).

Thyristor 16 is switched ON when the current is flowing in the appropriate direction (positive half-cycle) and has decayed to a predetermined threshold as will be explained more in detail later on. The current then divides between the two circuits 18 and 20 and is eventually diverted to shunt path 20 so that the arc across the switch 10 is rapidly extinguished. Once the arc across switch 10 has been extinguished and until the current drops to zero, the entire current flows through shunt 20 through rectifiers 14 and thyristor 16 and through the arc across switch 12, and the duration of this flow is determined to permit total deionization between the contacts of switch 10. In the next (negative) half-cycle a reverse current can flow neither through the shunt 20, which is blocked by the now nonconductive rectifiers 14, nor via switch 10, whose contact gap is sufficiently deionized to inhibit any restriking of the arc. Consequently, the arc in switch 12 is also extinguished and the circuit is therefore finally interrupted.

It is an important advantage of the invention that the opening of switches 10, 12 needs not be synchronized relative to the current phase so that switches 10, 12 and the operation mechanism thereof can be of a very simple construction. It will be apparent that the contact means of switches 10, 12 should withstand the arc during, say, a complete cycle of the current without pitting and this may be attained by providing contacts shaped to avoid dwelling of the arc roots, for instance having a helicoidal shape procuring a magnetic blowing effect on the arc roots. Devices of this kind are well known in the prior art and will not be described in detail. On the other hand, the rectifier means permit to use switches 10, 12 having almost no breaking power as the arc current flowing through the contacts thereof prior to deionization is held at a small value during a relatively long time interval. Thus powerful arc extinguishing means such as gas or oil blast means can be entirely dispensed of. Advantageously, vacuum or sulfur hexafluoride circuit interrupters may be used.

Clearly, this arrangement limits the current loading of the rectifiers and the time during which current flows therethrough and through thyristor 16. This time interval is preferably not greater than 0.5 millisecond, whereby rectifiers 14 do not have to withstand the recovery voltage permanently, since this reverse voltage is isolated by switch 12 once the arc therein has been extinguished. Switch 12 must be substantially open to protect shunt path 20 against application of the subsequent positive half cycle of the recovery voltage at the time of appearance of said half-cycle. On the other hand, although switch 12 might be opened well before switch 10, such an operation would stress the contacts of switch 12 exaggeratedly so that switches 10 and 12 are preferable opened simultaneously or switch 12 immediately (say less than 3 milliseconds) after switch 10. The allowable time shift between the opening movements of the contacts 10 and 12, respectively depends also upon the time interval necessary to obtain complete opening of the contacts and which is generally less than 10 milliseconds. It has been discovered that the time lagging (phase shift) of the opening movement of switch 12 should be less than 30 percent of the means total opening time of said switches and preferably well below this value, a unison opening seems to give very good results.

Referring now more particularly to the electronic trigger system for switching On (rendering conductive) the thyristor 16 (see FIGS. 2 and 3), a current transformer 122 operating as a current-sensing and impedance-matching device has its primary connected in the main line 18 and its secondary connected to an inductive shunt comprising a resistance 124 and an inductance 126 and operating as a phase shift device 127 establishing a phase lead relationship between the output and the input signal thereof. Connected across the inductive shunt 124, 126 is a clipper 129 comprising two oppositely poled diodes 128, 130 having a predetermined conductivity threshold.

The inductive shunt 124, 126, associated with the clipper 128, 130 furnishes an output signal which is in leading phase relationship with the current waveform line 18 and whose amplitude is clipped at the conductivity thresholds of the diodes 128 and 130. This signal is applied to a blocking network 131 comprising a transistor 132 whose triggering threshold is lower than the peak value of the clipped output signal. Transistor 132 is connected to a capacitance 134 and shunts the same when saturated. Capacitance 134 is connected between the emitter and a base of a unijunction transistor 136 which, via an amplifying transistor 138, controls the triggering of thyristor 16. The relaxation oscillator or frequency generator 139 formed by the transistor 136 and capacitance 134, and the shunting and amplifying transistors 132 and 138, are energized via conductors 140 and 141 connected to the terminals of switch 10 in way to be explained hereafter. The frequency generator 139 delivers pulses in nonblocked condition of a sufficiently high frequency, such as 1,000 cycles.

When the switch 10 opens, the arc voltage is transmitted by the conductors 140 and 141 as long as thyristor 16 remains nonconductive. The voltage is picked up downstream of all or some of the rectifiers 14 so as to have a feeding voltage for the triggering device available only during the positive half-cycles of the line current. The voltage dividing arrangement or currently supply means 143 comprising essentially resistance 142 and Zener diode 146 enables to have a constant voltage at conductor 148, which is determined by the threshold of diode 146 and which is appropriate for energizing the circuit controlling the switching-ON of the thyristor 16. The voltage between conductors 141 and 148 has a rectangular waveform whose polarity is defined by the forward direction of the rectifiers 14 and which is available for nearby a half-cycle of the operation after the opening of the switch 10. For reasons which will become more clearly apparent from the following description the energizing voltage is applied to the triggering device only after a predetermined delay which is provided by a delay circuit 151 comprising essentially a capacitance 150 and a resistance 152 connected in series with one another and to the conductors 141 and 148. Capacitance 150 triggers the firing of a transistor 154 by way of a Zener diode 156 so that the triggering delay, preferably of about 2 milliseconds of transistor 154 is determined by the time taken by the capacitance 150 to be charged to the conductivity threshold of the Zener diode 156. Via appropriate biasing resistances 157, 158, 160 and 162, the transistor 154 energizes the unijunction transistor 136 and the transistors 132, 138. There is no need to describe the diagram shown in FIG. 3 in further detail, the same comprising additional biasing resistances at various places in a manner well known to those skilled in the art.

Figure 1:
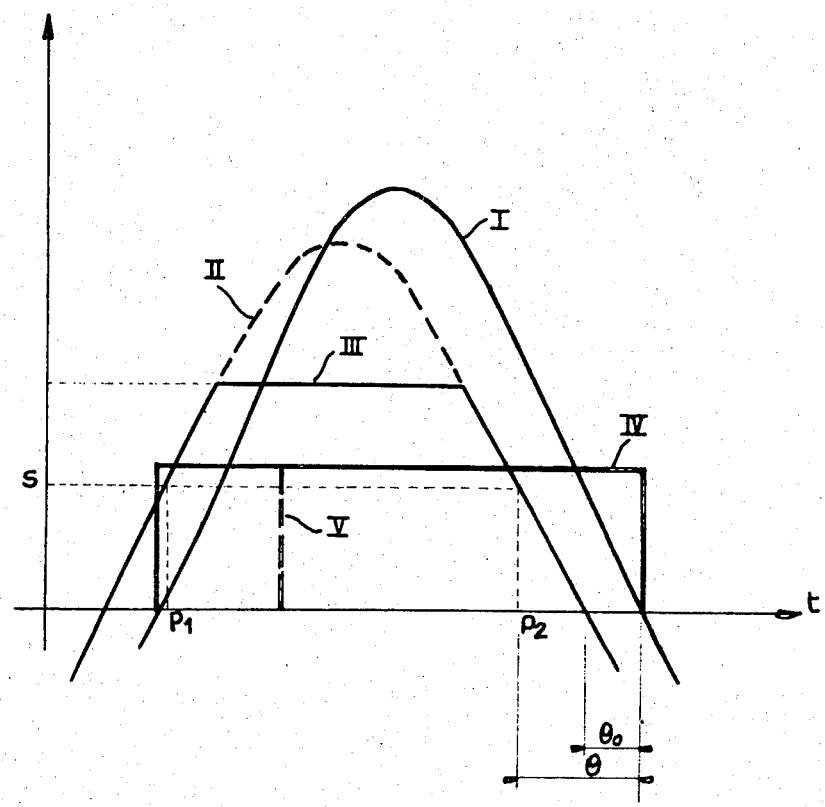
FIG. 1 shows the wave forms of the current and voltages in various points of a device according to the invention.

A description of the operation of the system shown in FIGS. 2 and 3 will now be given with reference more particularly to FIG. 1, in which variations of the current and voltage in various parts of the circuit are plotted against time. Curve I denotes the sinusoidal variation of the current in the main circuit 18. The inductive shunt formed by the resistance 124 and inductance 126 phase-shifts the current output of the current transformer 122 and produces a voltage which is proportional to the current I and out of phase therewith by the angle $\Theta_o$. Curve II in FIG. 1 represents this phase-shifted voltage. Its amplitude is limited by the clipper circuit 128, 130, and the clipped signal available at the output thereof is represented by curve III. The triggering threshold of transistor 132 is represented by the line S; as will be readily apparent, the transistor 132 remains saturated as long as the signal III exceeds the value S — i.e. for the time interval bounded by the points $P_1$ and $P_2$ in FIG. 1. Transistor 132 is nonconductive for any value of the signal III below the threshold S. The transistor 132, which is connected across the capacitance 134, shunts the same when saturated and thus prevents oscillation of generator 139 and the appearance of any triggering signal at the gate 19 of the thyristor 16 in the shunt path 20 across the main switch 10. However, when the transistor 132 is nonconductive, the capacitance 134 can charge up and thus, once the peak voltage has been reached, render the transistor 136 conductive. The triggering thereof produces a pulse signal which after amplification by transistor 138 is applied to the gate of thyristor 16.

The thyristor-gating signal occurring at the time $P_2$ is offset by a time interval $\Theta$ from the current zero and this phase shift depends upon the constant phase shift $\Theta_o$ introduced by the phase-shift circuit 124, 126 and upon the value of the slope of curve II, $dI/dt$, near current zero, these values being related by the relationship $(\Theta - \Theta_o) \, dI/dt = K$, where $K$ is a constant, and where $\Theta_o$ corresponds preferably to the minimum ON-state time interval of the thyristor 16 securing complete arc extinguishing at switch 10 for the highest expected line currents. As a matter of fact, it has been discovered that such an arrangement corresponding to said relation gives very good results whereby the thyristor is longer in its ON-state as the flowing therethrough is smaller.

This gives reliable current interruption while preventing any overloading of the thyristor.

The electronic triggering system is energized by the arc voltage across the switch 10 in the main line after this switch has opened. In the arrangement shown, the thyristor 16 receives a firing signal only when the polarity of the line current corresponds to the forward direction of the rectifiers 14. Therefore, the electronic circuit is energized only during the corresponding positive half-cycle so as to prevent energizing of the triggering means and firing of the thyristor 16 during the negative half-cycle of the circuit. Advantageously, the voltage is picked up behind the shunt rectifiers 14, for example across thyristor 16, as shown. The voltage is regulated by the Zener diode 146 and limited by means of dividing resistance 142. Curve IV in FIG. 1 represents the voltage applied at conductor 148 and clearly, if such square voltage wave form were to be used unchanged to energize the trigger circuit, the same would deliver a thyristor switch ON signal at the time $P_1$ and at the time $P_2$. Advantageously, to suppress the $P_1$ signal, which corresponds to a positive going current to be interrupted, energization of the trigger circuit is delayed by the delay circuit 151 comprising capacitance 150 and resistance 152. This delay circuit delays energization and provides a shift of the voltage step-up behind point $P_1$, as represented by curve V in FIG. 1. Consequently, the two conditions necessary to switch ON the thyristor 16 — i.e., nonconductivity of transistor 132 and energization of the electronic circuit — occur only at the time $P_2$, so that there is no risk of erroneous operation at $P_1$.

The invention is not of course limited to the electronic circuit which has been more particularly described with reference to FIGS. 2 and 3 and such circuit could be replaced by any equivalent circuit, such as a circuit containing logic elements.

FIG. 4 shows another embodiment of a trigger circuit according to the invention, the circuit shown in FIG. 4 (in which identical or analogous elements have been designated by the same numerals as in FIG. 3), differing from the system shown in FIG. 3, mainly in that the inductive shunt 124, 126 is connected directly into the main line 18. This feature obviates the need for a costly current transformer 122 whose dimensions are necessitated by the flow of the aperiodic component. The output signal of the inductive shunt 124, 126 is supplied to a DC amplifier 164 before arriving at transistor 132. Amplifier 164 is energized by a voltage-dividing system 166, 168 and a diode 170, and the negative component is prepared by a phase inverter transformer 172 whose secondary energizes amplifier 164 via a diode 173 and via a potential-limiting Zener diode 174. A clipper comprising oppositely connected diodes 176, 178 is connected into the circuit ahead of amplifier 164 so as to limit in a manner similar to what was described with reference to the diodes 128, 130 of FIG. 3, the signal applied.

Figure 5:
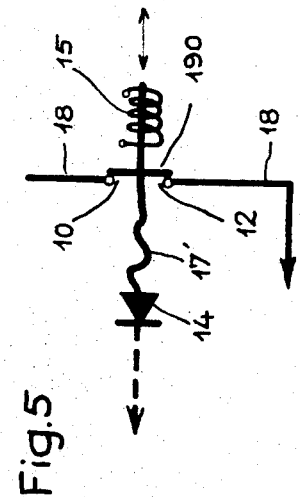
FIG. 5 shows schematically a movable bridge type interrupter.

FIG. 5 shows schematically how switches 10 and 12 can be combined in a single circuit interrupter having a bridge-type movable contact member 190 cooperating with a single opening relay 15. A flexible conductor 17' is connected to movable contact 190 and corresponds electrically to conductor 20 of FIGS. 2 and 3.

Figure 6:
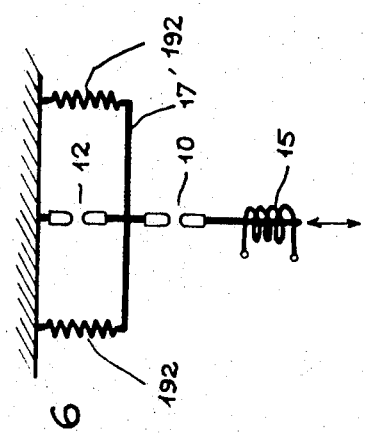
FIG. 6 shows schematically an interrupter having two pairs of contacts capable of being opened one immediately after the other.

FIG. 6 schematically shows another embodiment of a single circuit interrupter combining switches 10 and 12. Relay 15 first opens contact pair 10 and immediately thereafter, for example by means of a not shown driving abutment, contact pair 12, which is biased by springs 192. The common conductor of contact pairs 10 and 12 corresponds to conductor 17 of FIGS. 2 and 3.

What is claimed is:

1. A switching system adapted for use in a line carrying an alternating current, comprising a first current path including first separable contact means adapted to draw an arc, a shunt path connected in parallel with said first path and having a plurality of similarly poled series connected rectifiers connected in series with normally OFF state thyristor means having control gate means and rated to withstand the arcing voltage of said first contact means; second separable contact means adapted to draw an arc and connected in series with the parallel combination of said first and shunt path; random opening means to substantially simultaneously separate said first and second contact means regardless of the phase of the current flowing therethrough; the series connection of said rectifiers and thyristor means having a peak reverse voltage rated to withstand the restriking voltage across said first contact means; and trigger means responsive to said alternating current and connected to said control gate means to switch ON said thyristor means after opening of said first contact means shortly before the end of the current half-cycle during which said rectifiers are conductive for said current to divert from said first path to said shunt path a current consistent with the current rating of said series connected rectifiers and thyristor means, the opening of said second contact means preventing the application of the consecutive forward half-cycle of the restriking voltage to said shunt path.

2. A system according to claim 1, said random opening means being adapted to operate the opening of said second contact means not later than 30 percent of the means opening time of said first and second contact means after operation of the opening of said first contact means.

3. A system according to claim 1, said random opening means being adapted to substantially open said second contact means not later than 3 milliseconds after substantially opening of said first contact means.

4. A system according to claim 1, said thyristor means comprising solid-state reverse blocking thyristor means.

5. A system according to claim 1, said first and second contact means being of substantially identical rating and design.

6. A system according to claim 5, said random opening means being adapted so that the time shift of the opening movements of said first and second contact means, respectively is not greater than 30 percent of the duration of the means opening movement of said first and second contact means.

7. A system according to claim 1, said random opening means being adapted to open said first and second contact means in unison.

8. A system according to claim 1, said first and second contact means being incorporated in a movable bridge-type contact circuit interrupter.

9. A system according to claim 1, said random opening means comprising mechanical linkage means between said first and second contact means.

10. A system according to claim 1, said trigger means being adapted to switch ON said thyristor means at a time interval $\theta$ before zero current according to the relation $(\theta-\theta_o) \, dI/dt = K$, where $\theta_o$ is the minimum ON state time interval of said thyristor means securing complete arc extinguishing for the highest expected line currents of said first contact means; $dI/dt$ the time derivative of the current flowing through said first contact means at the end of said half cycle; and $K$ a constant.

11. A system according to claim 1, said trigger means comprising current supply means connected in feeding relation to the terminals of said first contact means.

12. A system according to claim 11, said current supply means comprising rectifier means connected to render ineffective said current supply means during the time said rectifiers are in the reverse-blocking mode.

13. A system according to claim 12, said rectifier means comprising a Zener diode.

14. A system according to claim 11, said current supply means being connected in feeding relation across said thyristor means.

15. A system according to claim 1, said trigger means comprising current supply means adapted to be energized by the arcing voltage across said first contact means.

16. A system according to claim 11, said current supply means feeding said trigger means through a time delay circuit proportioned to prevent triggering of said thyristor means at the starting end of said half cycle.

17. A system according to claim 16, said time delay circuit introducing a time delay of about 2 milliseconds.

18. A system according to claim 1, said trigger means comprising a frequency generator adapted to deliver triggering pulses to said gate; blocking means to selectively block said frequency generator; and current-sensing means to sense the current flowing in said line; said blocking means comprising threshold means connected to said current-sensing means to control the triggering point of time of said thyristor means.

19. A system according to claim 11, said trigger means further comprising a frequency generator adapted to deliver triggering pulses to said gate; and means responsive to the waveform of said current flowing in said line to control the triggering point of time of said thyristor means.

20. A system according to claim 18, said trigger means further comprising phase shift means to deliver an output signal in leading phase relationship with the waveform of said current to drive said threshold means through clipper means.

21. A system according to claim 18, said current-sensing means comprising an inductive shunt incorporated in said line.